US008781095B2

(12) United States Patent
Takaoka et al.

(10) Patent No.: US 8,781,095 B2
(45) Date of Patent: Jul. 15, 2014

(54) COMMUNICATION APPARATUS AND CONTROLLING METHOD OF THE SAME

(75) Inventors: Tatsuo Takaoka, Kanagawa (JP); Tomohide Machida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1518 days.

(21) Appl. No.: 12/115,176

(22) Filed: May 5, 2008

(65) Prior Publication Data

US 2008/0279361 A1    Nov. 13, 2008

(30) Foreign Application Priority Data

May 11, 2007 (JP) ................................ 2007-126479

(51) Int. Cl.
*H04M 3/42* (2006.01)
*H04M 11/04* (2006.01)
*H04M 11/00* (2006.01)
*H04M 1/00* (2006.01)
*H04M 3/00* (2006.01)
*H04B 1/38* (2006.01)

(52) U.S. Cl.
USPC ............... 379/216.01; 379/51; 379/100.14; 379/201.01; 379/355.01; 379/355.05; 455/564

(58) Field of Classification Search
USPC .............. 379/93.17, 93.23, 216.01, 40, 51, 379/100.14, 201.01, 207.14, 229, 233, 350, 379/352, 354, 355.01, 355.05; 455/460, 455/564
See application file for complete search history.

(56) References Cited

U.S. PATENT DOCUMENTS

| 5,396,341 | A | * | 3/1995 | Takahashi et al. | ............ 358/400 |
| 6,700,674 | B1 | * | 3/2004 | Otsuka et al. | ................ 358/1.15 |
| 2002/0122203 | A1 | * | 9/2002 | Matsuda | ...................... 358/1.15 |
| 2005/0162705 | A1 | * | 7/2005 | Kim | .............................. 358/402 |
| 2005/0260977 | A1 | * | 11/2005 | Park | ............................. 455/418 |
| 2007/0172199 | A1 | * | 7/2007 | Kobayashi et al. | ............. 386/95 |

FOREIGN PATENT DOCUMENTS

| JP | 9-37009 | 2/1997 |
| JP | 2004-289231 | 10/2004 |
| JP | 2006-23823 | 1/2006 |
| JP | 2006-86975 | 3/2006 |
| JP | 2006-287790 | 10/2006 |

* cited by examiner

*Primary Examiner* — Khai N Nguyen
(74) *Attorney, Agent, or Firm* — Oblon, Spivak, McClelland, Maier & Neustadt, L.L.P.

(57) ABSTRACT

A communication apparatus having an abbreviated dialing function allowing input of a destination number with fewer key input operations and a method of controlling the communication apparatus capable of reducing the operations of inputting a destination number is disclosed. The communication apparatus includes an abbreviated dialing input unit for inputting a destination number with fewer key input operations, a touch panel input/display unit for inputting the destination number, and a destination input operation menu controlling unit for controlling a menu display mode of a destination input operation menu on the touch panel input/display unit based on destination management information registering plural abbreviated dialing numbers referred to by the abbreviated dialing input unit.

11 Claims, 11 Drawing Sheets

FIG.5

| TYPE ETC. | DESTINATION NUMBER | DESTINATION NAME | LINE TYPE | SEARCHED CHARACTER (LINE) |
|---|---|---|---|---|
| ABBR.000 | 045-123-4567 | AIKAWA-SAN | G3FAX | A(A) |
| ABBR.001 | kkaida@xxx.co.jp | AIDA-SAN | Mail | A(A) |
| ABBR.002 | 0463-44-5555 | KISHIKAWA-SAN | G3FAX | KI(KA) |
| ⋮ | ⋮ | ⋮ | ⋮ | ⋮ |
| ABBR.N-1 | | | | |
| ABBR.N | | | | |
| TEMPORARY 00 | 046-223-4455 | | G3FAX | |
| TEMPORARY 01 | 046-234-9876 | | G3FAX | |
| ⋮ | ⋮ | | ⋮ | |
| TEMPORARY M | | | | |

(DESTINATION MANAGEMENT INFORMATION)

FIG.6A

| ○READY TO FAX    SET DRAFT &DESIGNATE DEST. | | |
|---|---|---|
| MEMORY TRANSMISSION | | 100% |
| G3FAX: | | |
| | EXTENDED TRANSMISSION | COMMUNICATION INFORMATION |

FIG.6B

| ○READY TO FAX    IF NO MORE DEST, START. | | |
|---|---|---|
| MEMORY TRANSMISSION | | 100% |
| G3FAX □039:ISHIKAWA-SAN | | NO OF DEST.:1 |
| ADD DESTINATION | EXTENDED TRANSMISSION | COMMUNICATION INFORMATION |

(□: INDICATES ABBREVIATION)

FIG.6C

| <ABBR. REGISTRATION/CHANGE> | | | |
|---|---|---|---|
| DESIGNATE NUMBER OT BE REGISTERED /CHANGED ABBR.(000~999) | | | |
| REGISTRATION STATUS | MOVE/ COPY | | PREVIOUS MENU |

FIG.6D

| <ABBR. REGISTRATION/CHANGE>[222]   INPUT FAX NUMBER | | | |
|---|---|---|---|
| G3 | | | |
| (INSERT DESTINATION NAME : OFF) | | | |
| DESTINATION NAME | VARIOUS SETTINGS | CANCEL | SET |

COMMUNICATION APPARATUS AND CONTROLLING METHOD OF THE SAME

BACKGROUND OF THE INVENTION

1. Field of the Invention

The present invention generally relates to a communication apparatus having an abbreviated dialing function allowing a user to input destination numbers with fewer key operations and a method of controlling such a communication apparatus.

2. Description of the Related Art

Conventionally, an abbreviated dialing function to input a destination number with fewer key operations has been generally employed in communication apparatuses such as a facsimile machine, a network facsimile machine, and a digital multi-function peripheral (MFP), reducing the user's operations of inputting a destination, as described in Japanese Patent Application Publication Nos. 2006-287790, 2006-23823, and 2006-86975.

On the other hand, generally, most users appreciate that user-friendly functions are succeeded in new popular models so as to continuously use the up-to-date functions in new models. Similarly, a developer (manufacturer) appreciates that such friendly functions can be implemented in new models with less developing efforts, thereby enabling entering into development in a new field easily.

SUMMARY OF THE INVENTION

The present invention is made in light of such circumstances and may provide a communication apparatus allowing users to input destination numbers with fewer operations and a method of controlling such a communication apparatus.

According to an aspect of the present invention, a communication apparatus includes an abbreviated dialing input unit for inputting a destination number with fewer key input operations; a touch panel input/display unit for inputting a destination number; and a destination input operation menu controlling unit for controlling a menu display mode of a destination input operation menu on the touch panel input/display unit based on destination management information registering plural abbreviated dialing numbers referred to by the abbreviated dialing input unit.

Further preferably, information elements registered in the destination management information include the abbreviated dialing number and the corresponding destination number, destination name, line type, and searched for character, the destination input operation menu on the touch panel input/display unit including a first display area and a second display area, the information elements searched for by using the searched for character as a key being displayed in the first display area in a prescribed format, the elements to be used as keys being arranged in the second display area, and when one of the elements in the second display area is touched, the destination management information registering the touched element as the information element is displayed in the first display area.

Still further preferably, when a new abbreviated dialing number is registered, a character displayed in the first display area of the touch panel input/display unit is set to be the searched for character corresponding to the new abbreviated dialing number.

According to another aspect of the present invention, there is provided a method of controlling a communication apparatus including an abbreviated dialing input unit for inputting a destination number with fewer key input operations and a touch panel input/display unit for inputting a destination number. The method includes a destination input operation menu controlling step of controlling a menu display mode of a destination input operation menu on the touch panel input/display unit based on destination management information registering plural abbreviated dialing numbers referred to by the abbreviated dialing input unit.

Further preferably, the method includes a registration step of registering at least the abbreviated dialing number and the corresponding destination number, destination name, line type, and searched for character as the information elements of the destination management information; and a displaying step of, when one of the elements displayed on the destination input operation menu of the touch panel input/display unit is touched, displaying the destination management information registering the touched element as the information element on the destination input operation menu.

Still further preferably, the method includes a setting step of, when a new abbreviated dialing number is registered, setting a character displayed in the first display area of the touch panel input/display unit to be the searched for character corresponding to the new abbreviated dialing number.

Therefore, according to an embodiment of the present invention, the communication apparatus provides an environment where a non-frequent user can select a destination easily by using the touch panel, and a user, including a frequent user, can select a destination in a short time by entering an abbreviated dial number at the same time.

BRIEF DESCRIPTION OF THE DRAWINGS

Other objects, features, and advantages of the present invention will become more apparent from the following description when read in conjunction with the accompanying drawings, in which:

FIG. 5 is a drawing schematically showing an exemplary destination management information used in an abbreviated dialing function and a redialing function;

FIGS. 6A through 6D are drawings schematically showing display contents of display section 7l;

DETAILED DESCRIPTION OF THE PREFERRED EMBODIMENTS

In the following, an exemplary embodiment of the present invention is described in detail with reference to the accompanying drawings.

Figure 1:
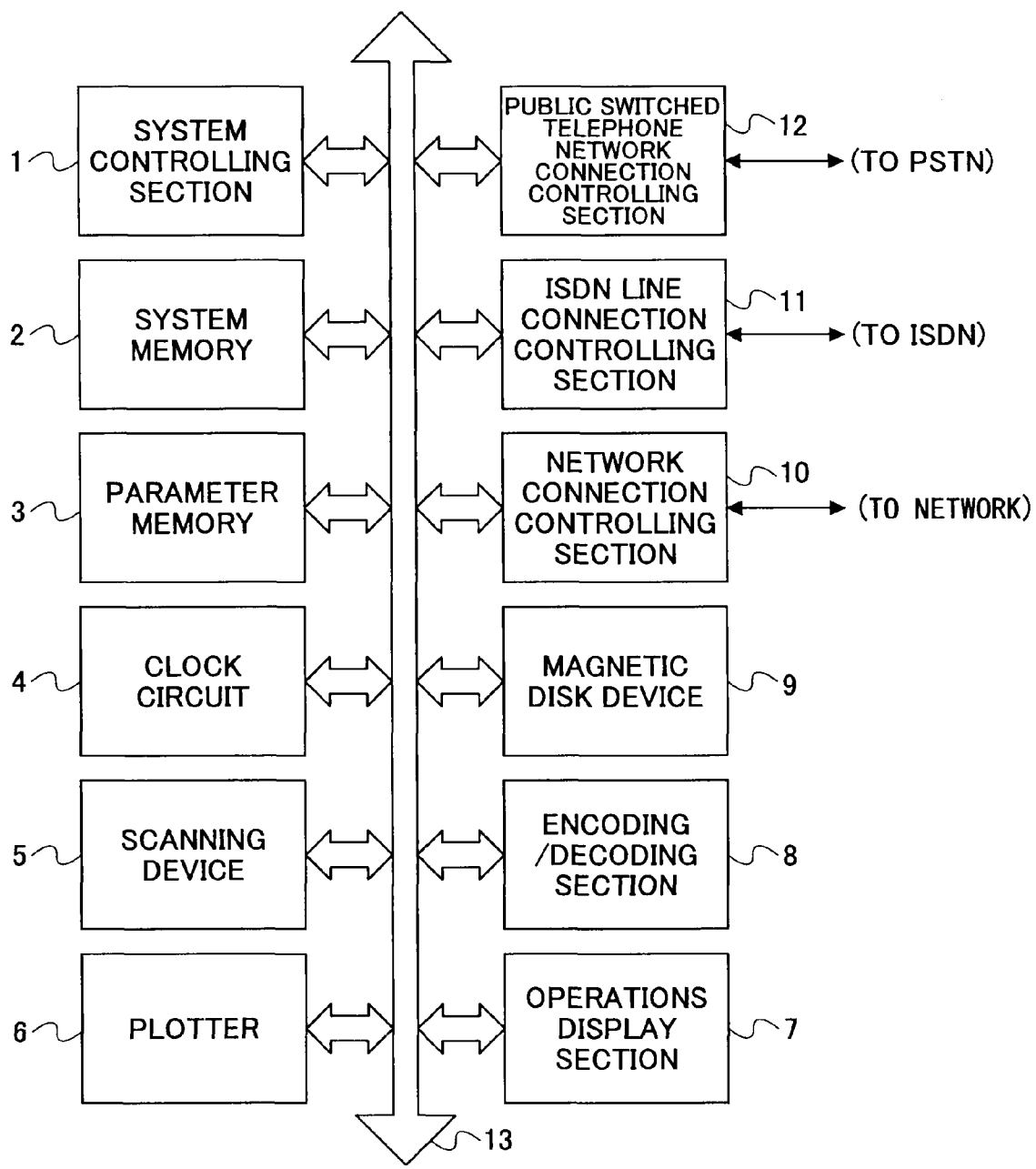
FIG. 1 is a drawing showing an exemplary configuration of a network image processing apparatus according to an embodiment of the present invention.

FIG. 1 shows an exemplary configuration of a network image forming apparatus (a communication apparatus) according to an embodiment of the present invention.

As shown in FIG. 1, the network image forming apparatus (communication apparatus) includes a system controlling section 1, a system memory 2, a parameter memory 3, a clock circuit 4, a scanning device 5, a plotter 6, an operations display section 7, an encoding/decoding section 8, a magnetic disk device 9, a network connection controlling section 10, an ISDN line connection controlling section 11, and a public switched telephone network connection controlling section 12. The system controlling section 1 controls each section of the network image forming apparatus and performs a process of facsimile transmission over a public switched telephone network or an ISDN line. The system memory 2 stores, for example, a controlling program performed by the system controlling section 1 and various data necessary when a program is being executed, and constitutes a work area for the system controlling section 1. The parameter memory 3 stores information unique to the network image forming apparatus. The clock circuit 4 outputs current time information.

The scanning device 5 reads a draft image with a prescribed resolution. The plotter 6 outputs an image with a prescribed resolution. The operations display section 7 is used to operate the network image forming apparatus and includes various keys and displays.

The encoding/decoding section 8 encodes and compresses a picture signal, and decodes and expands the encoded and compressed picture information to the original picture signal. The magnetic disk device 9 stores, for example, the encoded and compressed picture information, image data, and various data files.

The network connection controlling section 10 provides a connection to a network (including a local area network, an intranet, and the Internet) to send and receive e-mail through the network and communicate with an external terminal using an appropriate protocol.

The ISDN line connection controlling section 11 provides Group3/Group4 facsimile communications and calls over an ISDN line. The public switched telephone network connection controlling section 12 provides Group3 facsimile communications and calls over a public switched telephone network (PSTN).

Those system controlling section 1, system memory 2, parameter memory 3, clock circuit 4, scanning device 5, plotter 6, operations display section 7, encoding/decoding section 8, magnetic disk device 9, network connection controlling section 10, ISDN line connection controlling section 11, and public switched telephone network connection controlling section 12 are connected to each other via an internal bus 13. Therefore, data are exchanged between those elements through the internal bus 13.

Figure 2:
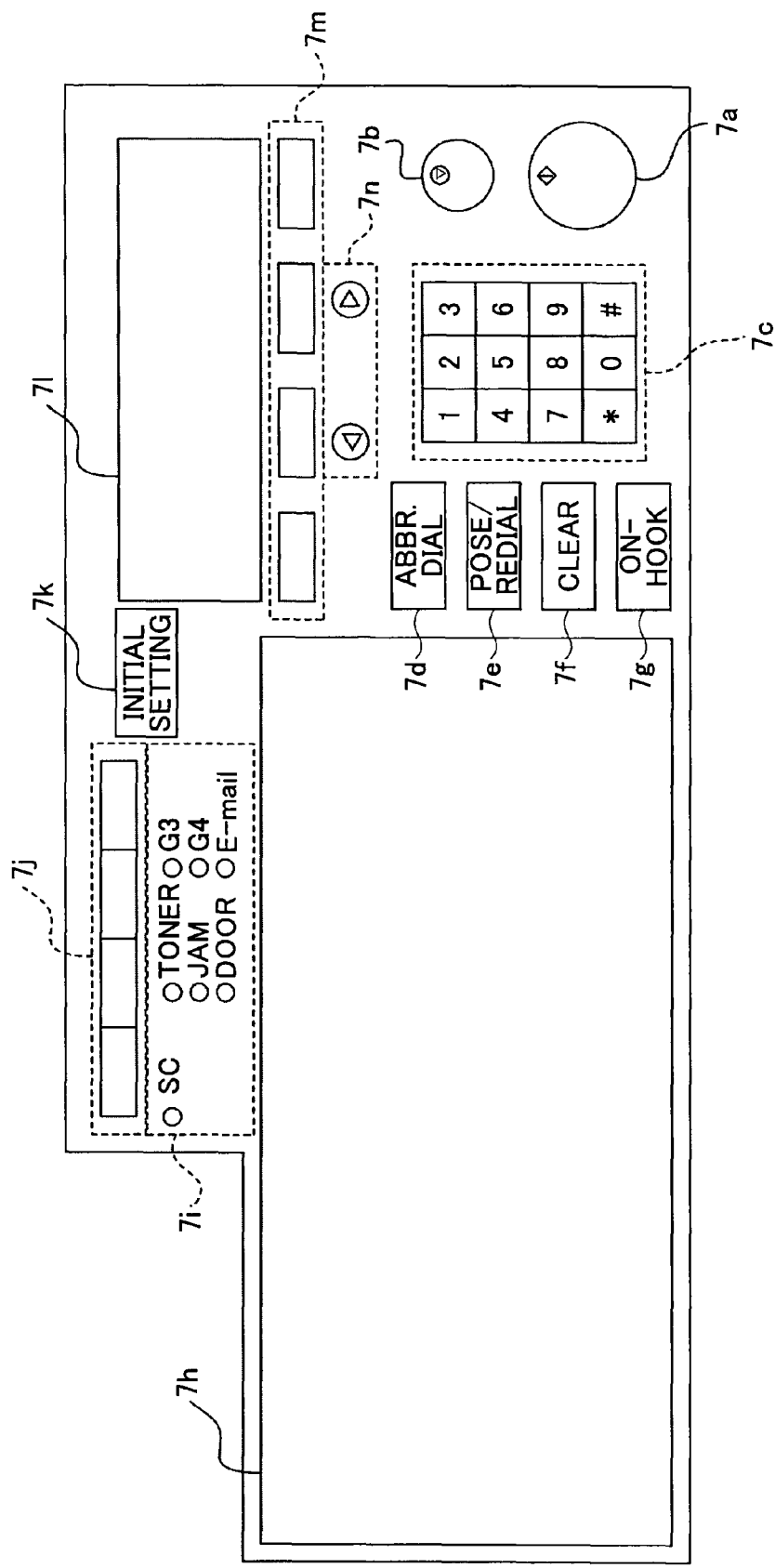
FIG. 2 is a drawing schematically showing an exemplary configuration of an operations display section of the network image processing apparatus.

FIG. 2 shows an exemplary configuration of the operations display section 7. The operations display section 7 includes a one touch dial number input function and a touch panel input as well.

As shown in FIG. 2, the operations display section 7 includes a start key 7a, a stop key 7b, ten keys 7c, an abbreviated dial key 7d, a pose/redial key 7e, a clear key 7f, an on-hook key 7g, a touch panel device 7h, a status display section 7i, function keys 7j, an initial setting key 7k, a display section 7l, soft keys 7m, and arrow keys 7n. The start key 7a is used to input an instruction to start, for example, sending and receiving operations of the network image forming apparatus. The stop key 7b is used to stop the operations of the network image forming apparatus. Ten keys 7c are used to input numerical information (values) such as phone numbers.

The abbreviated dial key 7d is used to start an input mode for inputting an abbreviated dialing number. The pose/redial key 7e is used to input posing (silent code) and redialing to the same destination. The clear key 7f is used to delete a single digit from a numeric value input by the ten keys 7c. The on-hook key 7g is used to start an on-hook communication mode.

The touch panel device 7h includes a color (or monochrome) liquid crystal display device and a coordinate detection transparent panel integrated in the liquid crystal display device so that the coordinate detection transparent panel detects a pressing operation (touching operation) at any coordinate position through the display surface of the liquid crystal display device. This touch panel device 7h is used as to input a destination as the main function (as described below).

The status display section 7i displays an operation status of the network image forming apparatus, indicating statuses such as a communication mode ("G3, G4, or mail mode"), "toner empty", "jamming", "door is open", "serviceman call" by the corresponding lamps (such as a LED) in this status display section.

The function keys 7j are used to perform user-defined functions such as registering a program.

The initial setting key 7k is used to perform initial setting operations of the network image forming apparatus. For example, some operations including registering an abbreviated dialing number can be selected from a menu displayed upon this initial setting key 7k being pressed.

The display section 7l includes a menu display device made of, for example, a liquid crystal device, and is used to display the contents of operations. The soft keys 7m are used to perform an operation item displayed on the corresponding parts of the display section 7l. The arrow keys 7n are used to move a selected operation item in the right and left directions.

Further, a buzzer (not shown) used as, for example, an alarm to the user is provided in the display section 7.

Figure 3:
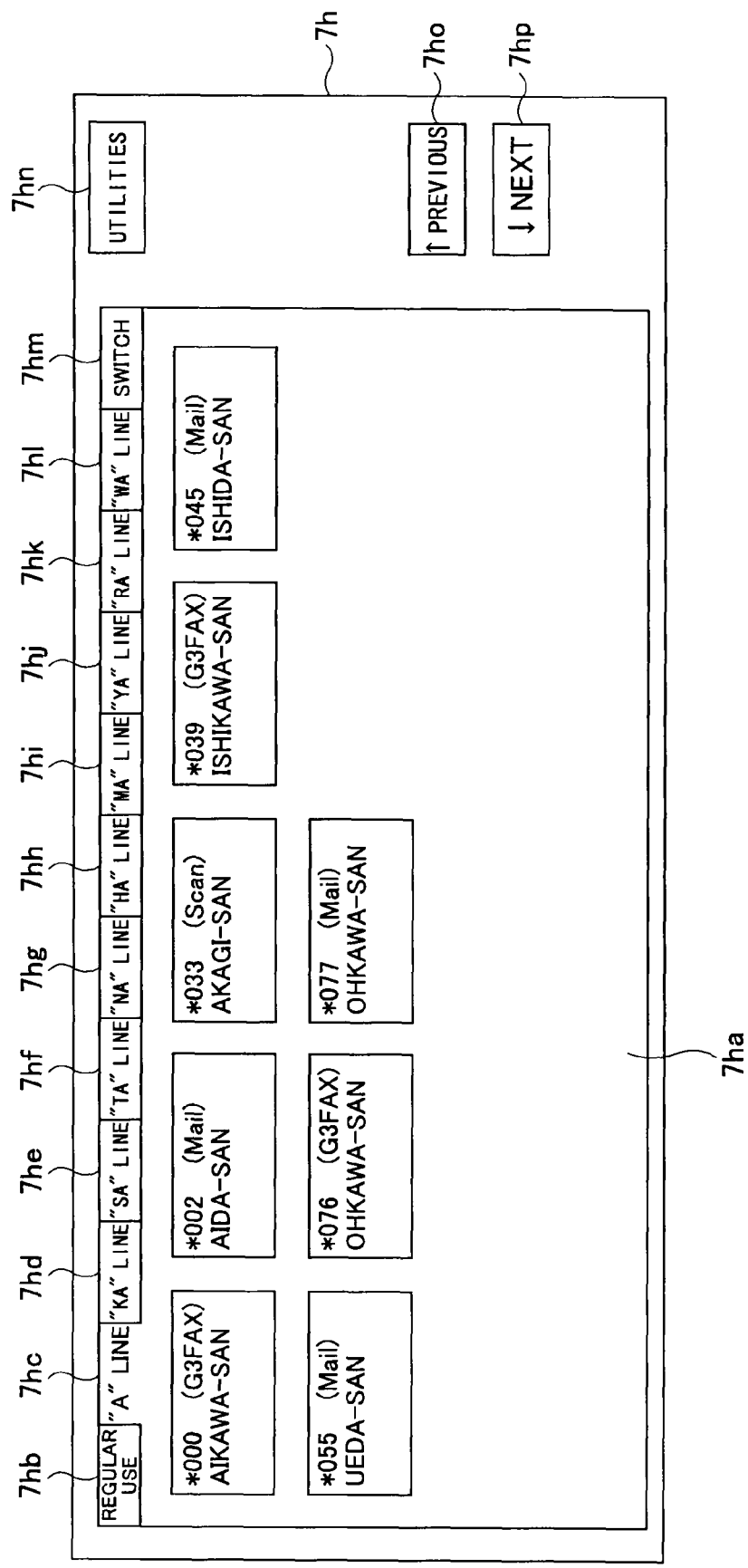
FIG. 3 is a drawing schematically showing an exemplary menu configuration of a touch panel device of the network image processing apparatus.

FIG. 3 shows a display example of the touch panel device 7h.

The touch panel device 7h includes a display area 7ha, a utility key 7hn, a previous (↑) key 7ho, and a next (↓) key 7hp. The display area 7ha includes plural tabs 7hb through 7hl on the upper portion of the display area 7ha. A list of destination information including registered abbreviated dialing numbers is displayed in the middle of the display area 7ha. However, in the network image forming apparatus, it should be noted that only destination information registering a searched for character corresponding to a character displayed on a selected tab is searched for and displayed in the middle of the display area 7ha. The explanation of the searched for character is given below.

In an example of FIG. 3, as an attribute of a character string to be used as a key in the searching process, "a" line through "wa" line in the Japanese "kana" syllabary table are assigned to the tabs 7hc through 7hl, respectively. As shown in FIG. 3, the "a" line, consisting of Japanese kanas (characters) "a", "i", "u", "e", and "o", is assigned to the tab 7hc. In the same manner, for example, the "ma" line, consisting of "ma", "mi", "mu", "me", and "mo", is assigned to the tab 7hi. In a status of FIG. 3, the tab 7hc that assigns the "a" line is selected. Therefore, destination information registering any Japanese kanas (characters) of "a", "i", "u", "e", and "o" as a search-for character is searched for in the searching process. Then the searched for and found destination information with the corresponding abbreviated dialing numbers are displayed in the middle of the display area 7ha in a manner so that each abbreviated dialing number is arranged in a conspicuous position in a rectangle for displaying the registered contents. Herein, a group of the destinations searched for and found is called "searched for group".

Further, only a single character can be used as an attribute of a character string to be used as a key in the searching process (detailed search). In this case, when, for example, a tab is selected where a Japanese kana (character) "a" is designated, only designation information registering the character "a" as the searched for character is searched for and found. Then, the searched for and found designation information including the corresponding abbreviated dialing number is displayed.

Further, in a case of FIG. 3, a term "regular use" is designated for the tab 7hb. When the "regular use" tab is selected, designation information registering a "null (blank)" as the searched for character is searched for and displayed. Still further, a term "switch" is designated for the tab 7hm; when the "switch" tab is operated, a display mode is alternately changed between, for example, Japanese display mode and English display mode.

Figure 4:
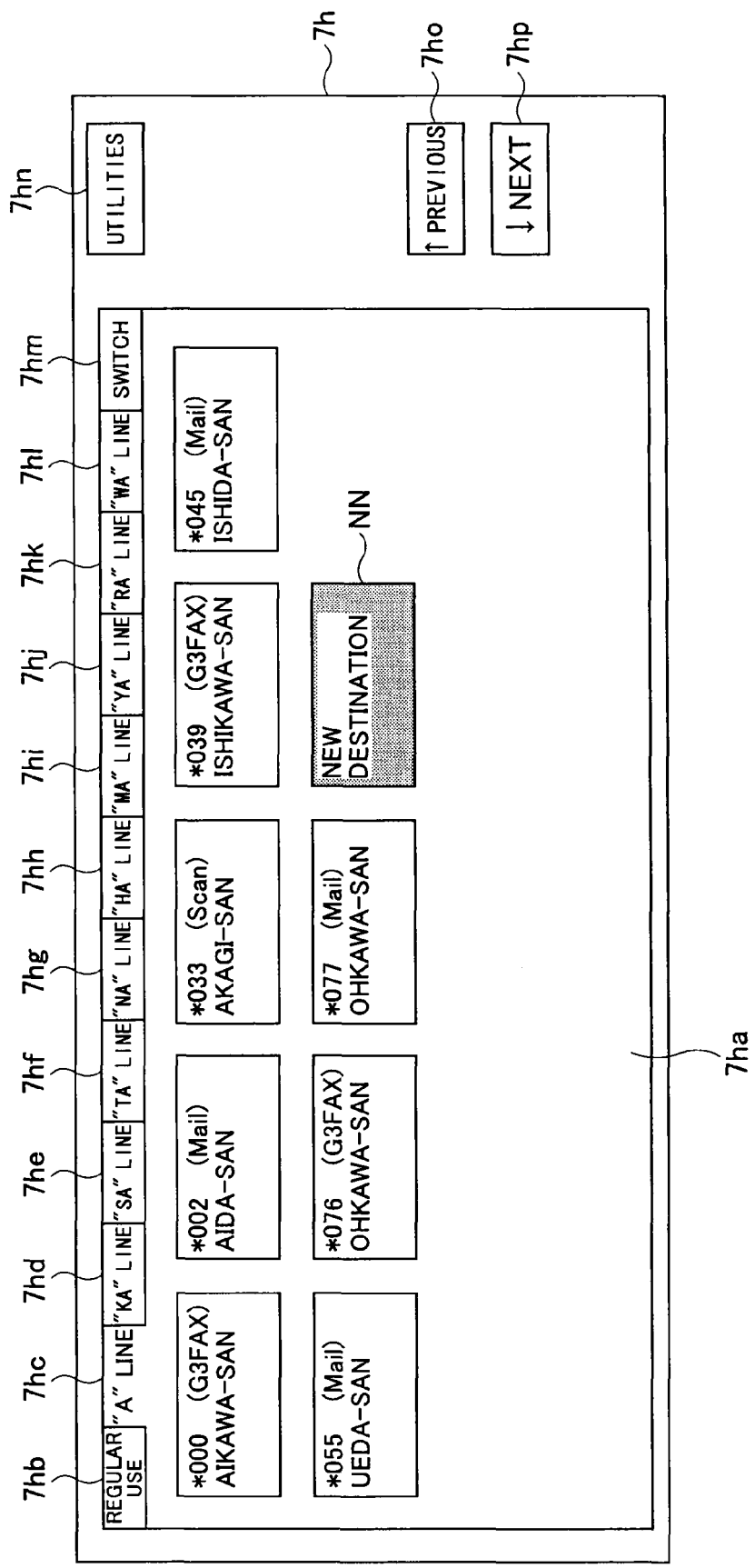
FIG. 4 is drawing schematically showing another exemplary menu configuration of the touch panel device.

Still further, the utility key 7hn, the previous (↑) key 7ho, and the next (↓) key 7hp are displayed on the right side of the touch panel device 7h. The utility key 7hn is used for various purposes. For example, when the utility key 7hn is operated during the registration of a new abbreviated dialing number, an operation element "NN" of a new destination is displayed as shown in FIG. 4. A user can register a new abbreviated dialing number by touching the operation element "NN" (details are described below).

The previous (↑) key 7ho, and the next (↓) key 7hp are used to move to "the previous page" and "the next page", respectively, of the displayed contents in the display area 7ha.

FIG. 5 shows an example of destination management information used in an abbreviated dial function and a redial function.

As shown in FIG. 5, the elements of the destination management information include "Type etc.", "Destination number", "Destination name", "Line type", and "Searched for character". The element "Type etc." is used to classify a temporary destination referred to in an abbreviated dialing or redialing status. The element "Destination number" is used to store, for example, a destination number and an electronic mail address. The element "Destination name" is used to store registered destination names. The element "Line type" indicates a type of line used in communicating to the destination, including G3FAX, G4FAX, Mail, and Scan. The element "Searched for character" is to be searched for in the search process to obtain the abbreviated dialing number.

It should be noted no data are registered in the "Destination name" and the "Searched for character" in the data where the "Type etc." is "Temporary 00" through "Temporary M" ("M+1" number of data).

With the configuration described above, when the network image forming apparatus is in a stand-by status, a stand-by menu as shown in FIG. 6A is displayed on the display section 7l of the operations display section 7. In this status, when a user sets a document (draft), a process according to a flowchart as shown in FIG. 7 is performed.

Figure 7:
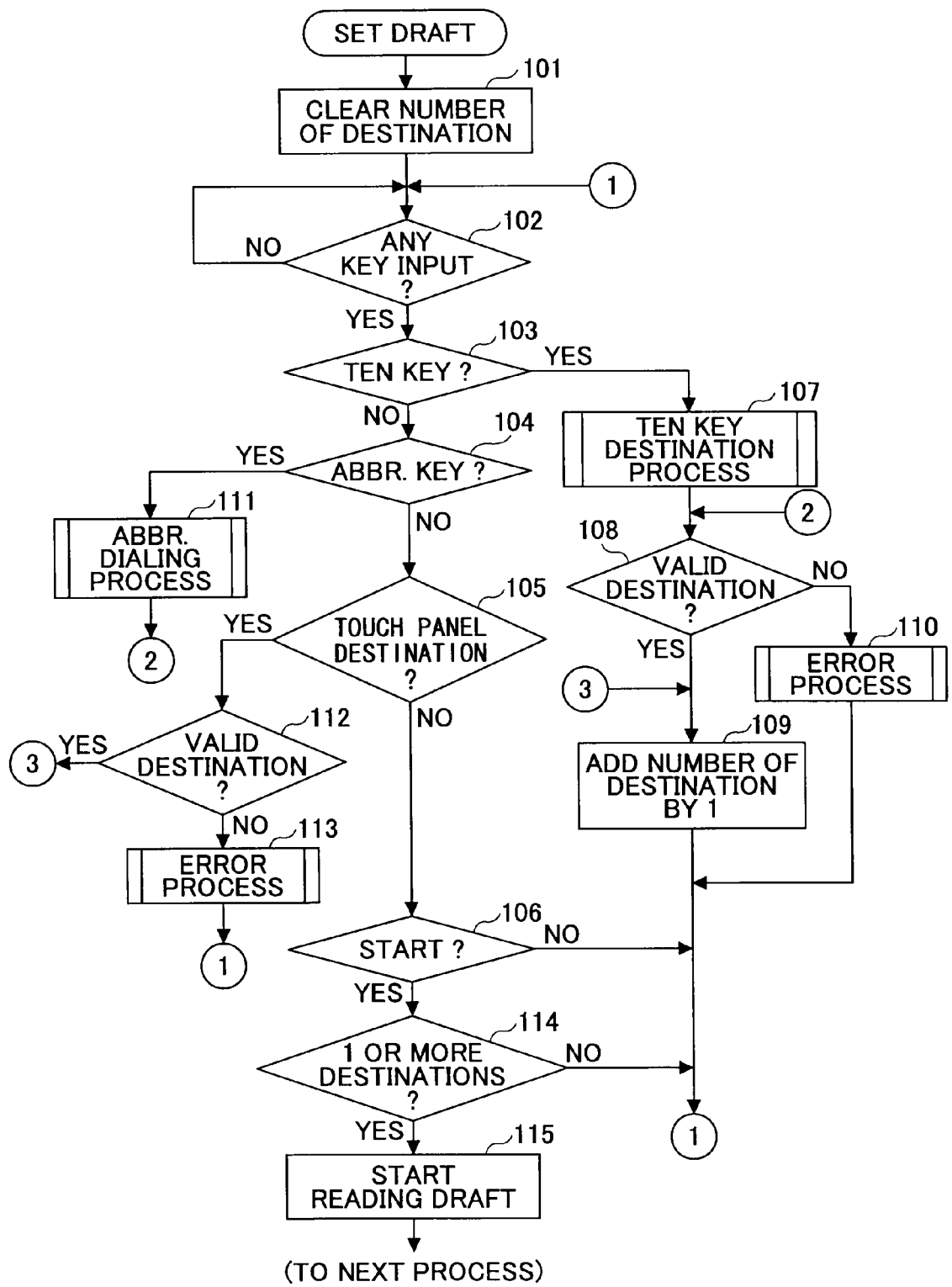
FIG. 7 is a flowchart showing an exemplary process executed when a draft document is set by a user.

First, as shown in FIG. 7, the number of destinations is reset to "0" (step S101). Then, the apparatus waits until any key operation is performed through the operations display section 7 (including an operation element of the touch panel device 7h) (NO loop in step S102).

When the result of step S102 becomes YES, it is determined whether the operation is made by a ten key 7c, the abbreviated dial key 7d, an operation element of the touch panel device 7h, or the start key 7a (in steps S103 through S106, respectively).

When it is determined that the ten key 7c is operated by the user (YES in step S103), the user operates ten keys 7c to input a destination number (step S107). Next, it is determined whether the destination number input using the ten keys in step S107 (Ten key destination process) is valid (step S108). When the result of step S108 is YES, the number of destinations is incremented by one (1) and the process goes back to step S102 and waits for another key entry by a user. On the other hand, when the result of step S102 is NO, an appropriate message such as "you input a wrong destination number" is displayed on the display section 7l (step S110), and the process goes back to step S102.

When it is determined that the abbreviated dial key 7d is operated by the user (YES in step S104), the user operates ten keys 7c to input a three-digit abbreviated dialing number (step S111). When the input operation of the abbreviated dialing number is completed, the process goes to step S108. Then, it is determined whether the destination is valid and the process goes to the following step. In the determination step S108, for example, a process may be used for determining whether appropriate information is registered with respect to the input abbreviated dialing number by referring to the destination management information. When it is determined that the destination is valid, a display including the destination name registered in the destination management information as shown in FIG. 6B is displayed on the display section 7l. On the other hand, when it is determined that the destination is not valid, an error message such as "not valid destination" is displayed on the display section 7l.

When it is determined that the operation element of the touch panel device 7h is operated (YES in step S105) by the user, it is determined whether the registered destination designated by the operation is valid (step S112). When the result of step S112 is NO, an error message such as "not valid destination" is displayed on the display section 7l (step S113), and the process goes back to step S102. On the other hand, when the result of step S112 is YES, the process goes to step S109, and then goes to the following step. Further, when a valid destination is input, a display including the destination name registered in the destination management information as shown in FIG. 6B is displayed on the display section 7l.

When it is determined that the start key 7a is operated by the user (YES in step S106), it is determined whether the number of destinations designated by the previous operation is more than "0" (step S114). When the result of the step 114 is YES, a draft document reading operation of the scanning device 5 is started (step S115), and the process goes to the following step to perform the data transmission.

On the other hand, when it is determined that the number of destinations is "0", the process goes back to step S102 to prompt a user to input a destination.

Figure 8:
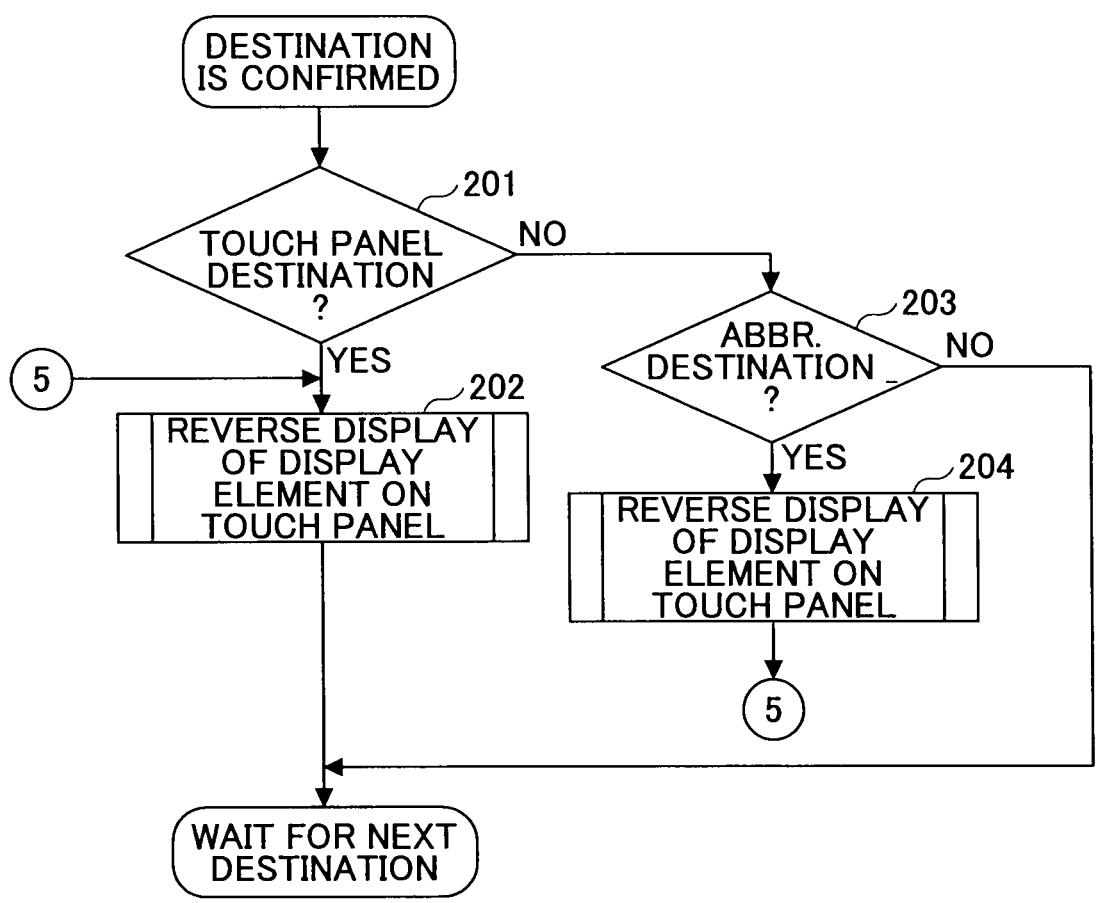
FIG. 8 is a flowchart showing an exemplary process when one destination is confirmed in a process in FIG. 7.

FIG. 8 is a flowchart showing an exemplary process when one destination is confirmed in the process shown in FIG. 7

When one destination is confirmed, it is determined whether the destination is confirmed by using the operation element of the touch panel device 7h (step S201). When the result of step S201 is YES, the corresponding display element of the operation element is reversed (step S202).

On the other hand, when the result of step S201 is NO, it is determined whether the destination is input by using the abbreviated dial key 7d (step S203). When the result of step S203 is YES, a display element of the operation element corresponding to the input abbreviated dialing number is reversed (step S204). When the result of step S203 is NO, this process ends.

In step S204, when the contents currently displayed in the display area 7ha do not correspond to the searched for group of the confirmed destination, the display contents may be arranged to be changed to the contents corresponding to the searched for group of the confirmed destination.

Figure 9:
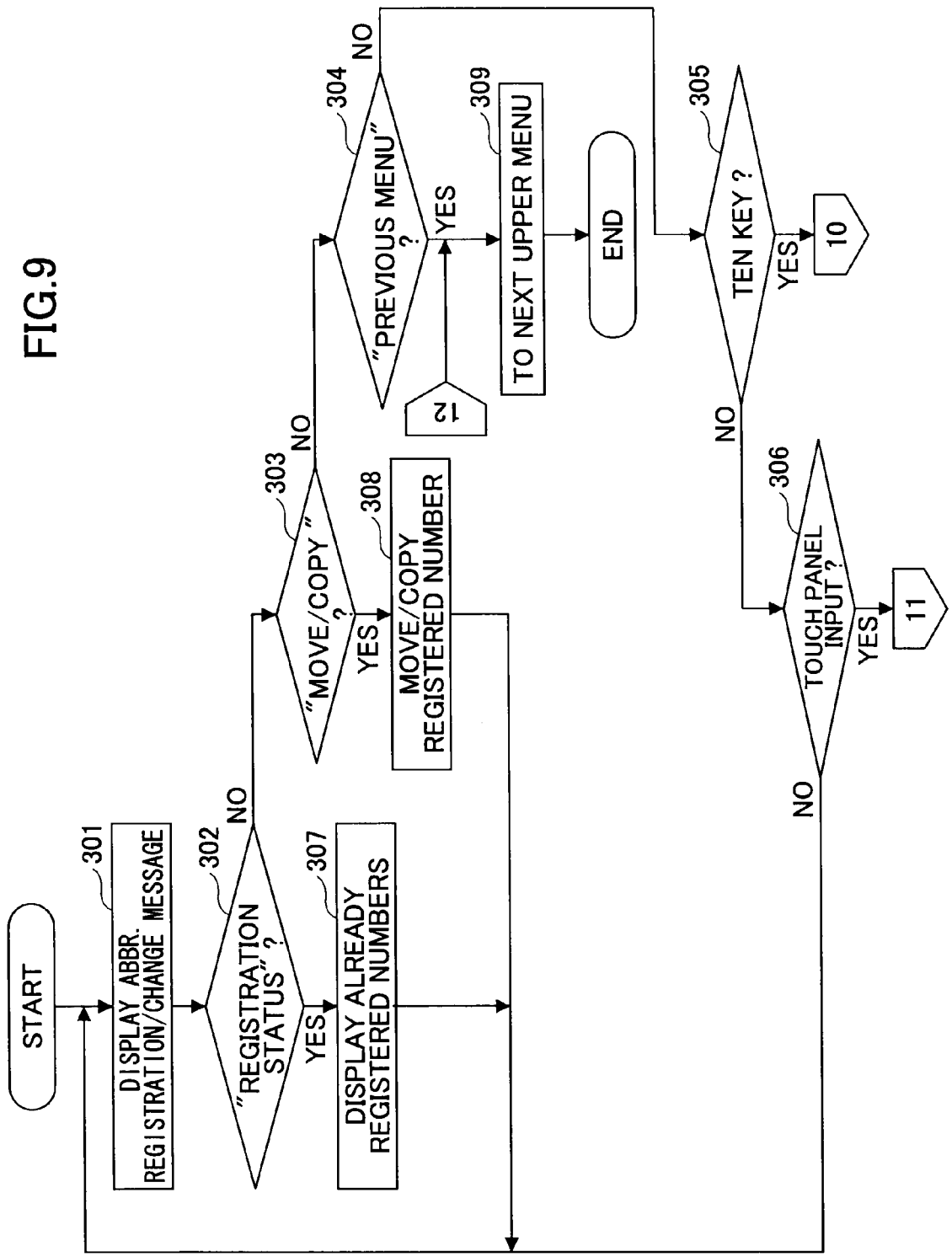
FIGS. 9 through 11 are flowcharts showing an exemplary process when an abbreviated dialing number is registered.
Figure 10:
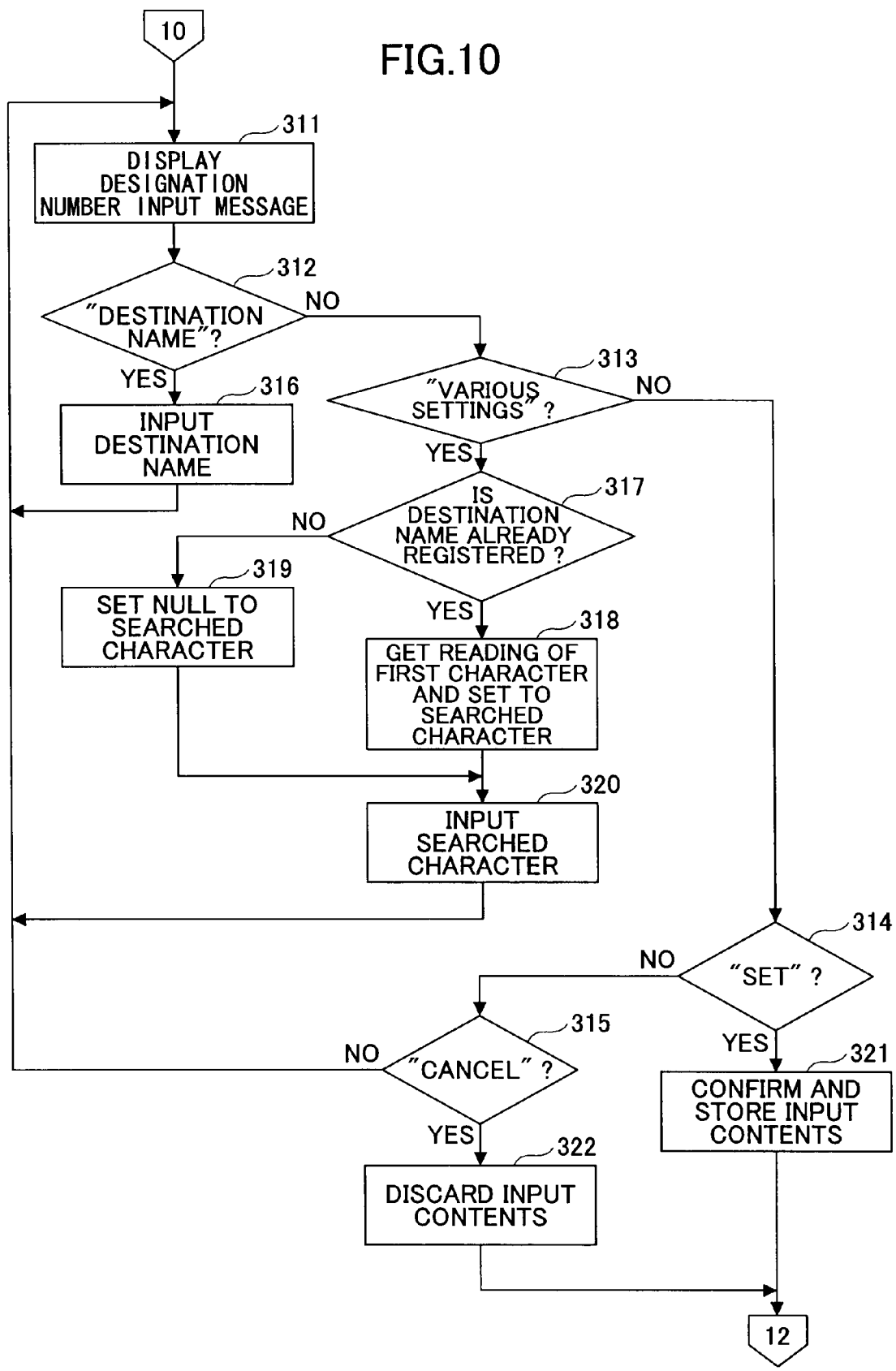
Figure 11:
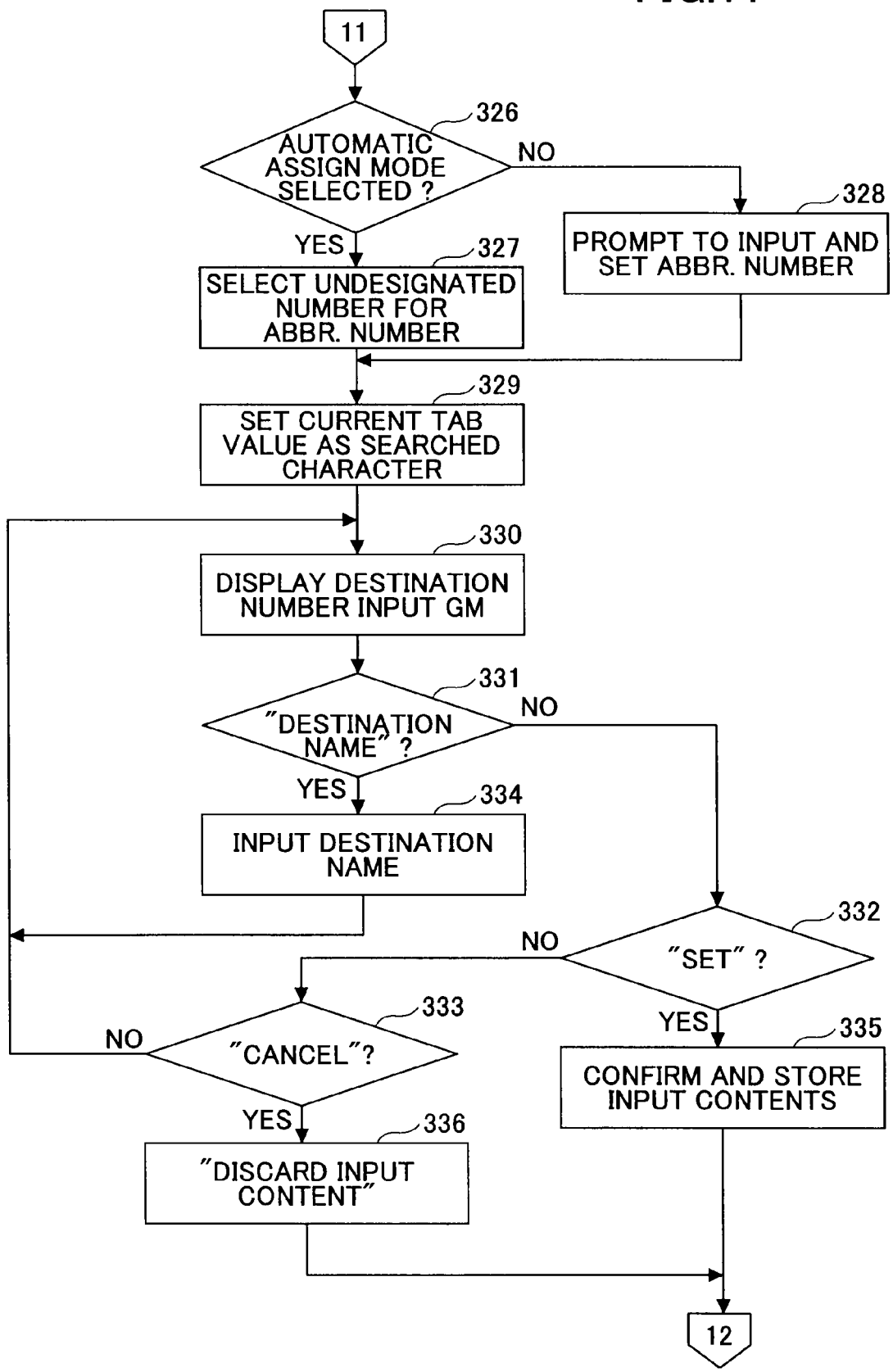

Next, a process of registering an abbreviated dialing number is described with reference to FIGS. 9 through 11. A registration process of an abbreviated dialing number can be selected from a menu displayed upon the initial setting key 7k being operated (not shown).

First, a guidance message as shown in FIG. 6C is displayed (step S301). Then, a user's operation is monitored and it is determined whether the user operates a soft key 7m corresponding to any one of "Registration status", "Move/Copy", and "Previous menu", a ten key 7c, or the operation element "NN" (see FIG. 4) of the new abbreviated dialing number by operating the utility key 7hn of the touch panel device 7h (steps S302 through S306, respectively).

When the soft key 7m corresponding to the "Registration status" is operated and the result of step S302 is YES, for example, a list of abbreviated dialing numbers registered in the destination management information is displayed (step S307).

Further, when the soft key 7m corresponding to the "Move/Copy" is operated and the result of step S303 is YES, a process of moving and copying the registered abbreviated dialing number is performed (step S308).

Still further, when the soft key 7m corresponding to the "Previous menu" is operated and the result of step S304 is YES, a menu of the next upper layer is displayed on the display section 7l (step S309).

When the ten key 7c is operated and the result of step S305 is YES, a destination number input guidance message as shown in FIG. 6D is displayed on the display section 7l (step S311). Then a user's operation is monitored and it is determined whether the user operates a soft key 7m corresponding to any one of "Destination name", "Various settings", "Cancel", and "Set" (steps S312 through S315, respectively).

When the soft key 7m corresponding to the "Destination name" is operated and the result of step S312 is YES, a process of inputting a destination name is performed (step S316).

When the soft key 7m corresponding to the "Various settings" is operated and the result of step S313 is YES, an operation of setting the searched for character is performed. In this operation, first, it is determined that the destination name is already registered (step S317). When the result of step S317 is YES, the first character of the reading of the first character of the registered destination name is obtained and the obtained character is set as the searched for character (step S318). On the other hand, when the result of step S317 is NO, a null (blank) is set to be the searched for character (step S319). By doing this, after an initial value of the searched for character is set, a user is prompted to input the searched for character (step S320).

Further, when the soft key 7m corresponding to the "Set" is operated and the result of step S314 is YES, the input contents are confirmed and stored (step S321). Then this operations ends and the menu displayed is changed to the next upper layer menu (step S309).

Still further, when the soft key 7m corresponding to the "Cancel" is operated and the result of step S315 is YES, the input contents are discarded (step S322). Then this operation ends and the menu displayed is changed to the next upper layer menu (step S309).

Still further, when the operation element "NN" of the "new destination" displayed by operating the utility key 7hn on the touch panel device 7h is operated and the result of step 306 is YES, first, it is determined whether a mode of automatically assigning an abbreviated dialing number is set (step S326).

When the result of step S326 is YES, an abbreviated dialing without a registered destination number is selected by referring to the destination management information, and the selected abbreviated dialing number is registered (step S327). On the other hand, when the result is step S326 is NO, the user is prompted to input a three-digit abbreviated dialing number using the ten keys 7c, and the input number is registered as the abbreviated dialing number (step S328).

Next, a character registered in the tab that is currently operated is obtained and the obtained character is set as the searched for character (step S329).

Then, the destination number input guidance message as shown in FIG. 6D is displayed on the display section 7l (step S330) Then a user's operation is monitored and it is determined whether the user operates a soft key 7m corresponding to any one of "Destination name", "Cancel", and "Set" (steps S331 through S333, respectively).

When the soft key 7m corresponding to the "Destination name" is operated and the result of step S331 is YES, a process of inputting a destination name is performed (step S334).

Further, when the soft key 7m corresponding to the "Set" is operated and the result of step S332 is YES, the input contents are confirmed and stored (step S335). Then this operations ends and the menu displayed is changed to the next upper layer menu (step S309).

Still further, when the soft key 7m corresponding to the "Cancel" is operated and the result of step S333 is YES, the input contents are discarded (step S336). Then this operation ends and the menu displayed is changed to the next upper layer menu (step S309).

As described above, in this embodiment of the present invention, a user can designate a destination in a similar manner whether the user directly operates an abbreviated dialing number or the user operates by referring the display contents on the touch panel device 7h, thereby allowing a user to select a most suitable operation depending on the user's proficiency level.

Further, the destination management information referred to when an abbreviated dialing number is used is directly used in the destination input process by the touch panel device 7h. Therefore, a management process of the destination management information becomes easier and required data capacity can be accordingly reduced.

Still further, the destination designated through the direct operation of the abbreviated dialing number and the destination designated through the touch panel 7h operations can be shown as equivalent operations. Therefore a user feels more comfortable than ever when, for example, the user needs to transmit to both a destination whose registered number is known to the user and a destination whose registered number is unknown to the user at the same time.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

The present application is based on and claims the benefit of priority of Japanese Patent Application No. 2007-126479, filed on May 11, 2007, the entire contents of which are hereby incorporated herein by reference.

What is claimed is:
1. A communication apparatus comprising:
   an abbreviated dialing input unit configured to input a destination number with fewer key input operations;

a touch panel input/display unit configured to input the destination number, the touch input/display unit being separate from and operated in a different manner than the abbreviated dialing input unit; and a destination input operation menu controlling unit configured to control a menu display mode of a destination input operation menu displayed on the touch panel input/display unit based on destination management information registering plural abbreviated dialing numbers referred to by the abbreviated dialing input unit, the destination input operation menu including a first display area displaying abbreviated dialing numbers associated with at least one selected searched for character, wherein:

information elements registered in the destination management information include each abbreviated dialing number and corresponding destination number, destination name, line type, and searched for character, the destination input operation menu displayed on the touch panel input/display unit includes a second display area, information elements searched for by using the at least one selected searched for character as a key being displayed as a searched for group in a prescribed format in the first display area, plural elements to be used as keys being arranged in the second display area, and when one of the elements in the second display area is touched, a searched for group corresponding to at least one character assigned to the touched element is displayed in the first display area.

2. The communication apparatus according to claim 1, wherein
in registering a new abbreviated dialing number, a character of the searched for group displayed in the first display area of the touch panel input/display unit is set to be the searched for character corresponding to the new abbreviated dialing number.

3. The communication apparatus according to claim 1, wherein
each element in the second display area is displayed in a tab key.

4. The communication apparatus according to claim 1, wherein
at least some elements displayed in the second display area represent characters of the corresponding searched for group.

5. The communication apparatus according to claim 1, wherein
the elements displayed in the second area include an element representing a null character.

6. The communication apparatus according to claim 1, wherein
the elements displayed in the second area include an element representing a language selection switch to change the language displayed on the touch panel input/display unit.

7. The communication apparatus according to claim 1, wherein
a temporary number accompanying neither the destination name nor the searched for character can be registered in the area where the abbreviated dialing numbers are registered.

8. A method of controlling a communication apparatus including an abbreviated dialing input unit configured to input a destination number with fewer key input operations and a touch panel input/display unit configured to input the destination number, the method comprising:

controlling a menu display mode of a destination input operation menu displayed on the touch panel input/display unit based on destination management information registering plural abbreviated dialing numbers referred to by the abbreviated dialing input unit, the destination input operation menu including a first display area displaying abbreviated dialing numbers associated with at least one selected searched for character, wherein the touch panel input/display unit being separate from and operated in a different manner than the abbreviated dialing input unit, the method further comprising:

registering at least a destination number, destination name, line type, and searched for character with respect to each of the abbreviated dialing numbers as information elements of the destination management information; and when one of plural elements displayed on a second display area of the destination input operation menu is touched, displaying a searched for group corresponding to at least one character assigned to the touched element in the first display area, wherein the first display area and the second display area are included in the destination input operation menu displayed on the touch panel input/display unit, information elements searched for by using the at least one selected searched for character as a key being displayed as a searched for group in a prescribed format in the first display area, and plural elements to be used as keys being arranged in the second display area.

9. The method of controlling a communication apparatus according to claim 8, further comprising:
a setting step of, when a new abbreviated dialing number is registered, setting a character of the searched for group displayed in the first display area of the touch panel input/display unit to be the searched for character corresponding to the new abbreviated dialing number.

10. A non-transitory computer-readable medium storing computer-readable instructions thereon that when executed by a computer in a communication apparatus including an abbreviated dialing input unit configured to input a destination number with fewer key input operations and a touch panel input/display unit configured to input a destination number, cause the computer to perform a method comprising:

controlling a menu display mode of a destination input operation menu displayed on the touch panel input/display unit based on destination management information registering plural abbreviated dialing numbers referred to by the abbreviated dialing input unit, the destination input operation menu including a first display area displaying abbreviated dialing numbers associated with at least one selected searched for character, wherein the touch panel/display unit being separate from and operated in a different manner than the abbreviated dialing input unit, the method further comprising:

registering each abbreviated dialing number and corresponding destination number, destination name, line type, and searched for character as information elements of the destination management information; and when one of plural elements displayed on a second display area of the destination input operation menu is touched, displaying a searched for group corresponding to at least one character assigned to the touched element in the first display area, wherein the first display area and the second display area are included in the destination input operation menu displayed on the touch panel input/display unit, information elements searched for by using the at least one selected searched for character as a key being displayed as a searched for group in a prescribed format in the first display area, and plural elements to be used as keys being arranged in the second display area.

11. The non-transitory computer-readable medium according to claim 10 causing the computer in the communication apparatus to further perform the method of:

when a new abbreviated dialing number is registered, setting a character of the searched for group displayed in the first display area of the touch panel input/display unit to be the searched for character corresponding to the new abbreviated dialing number.

* * * * *